UNITED STATES PATENT OFFICE.

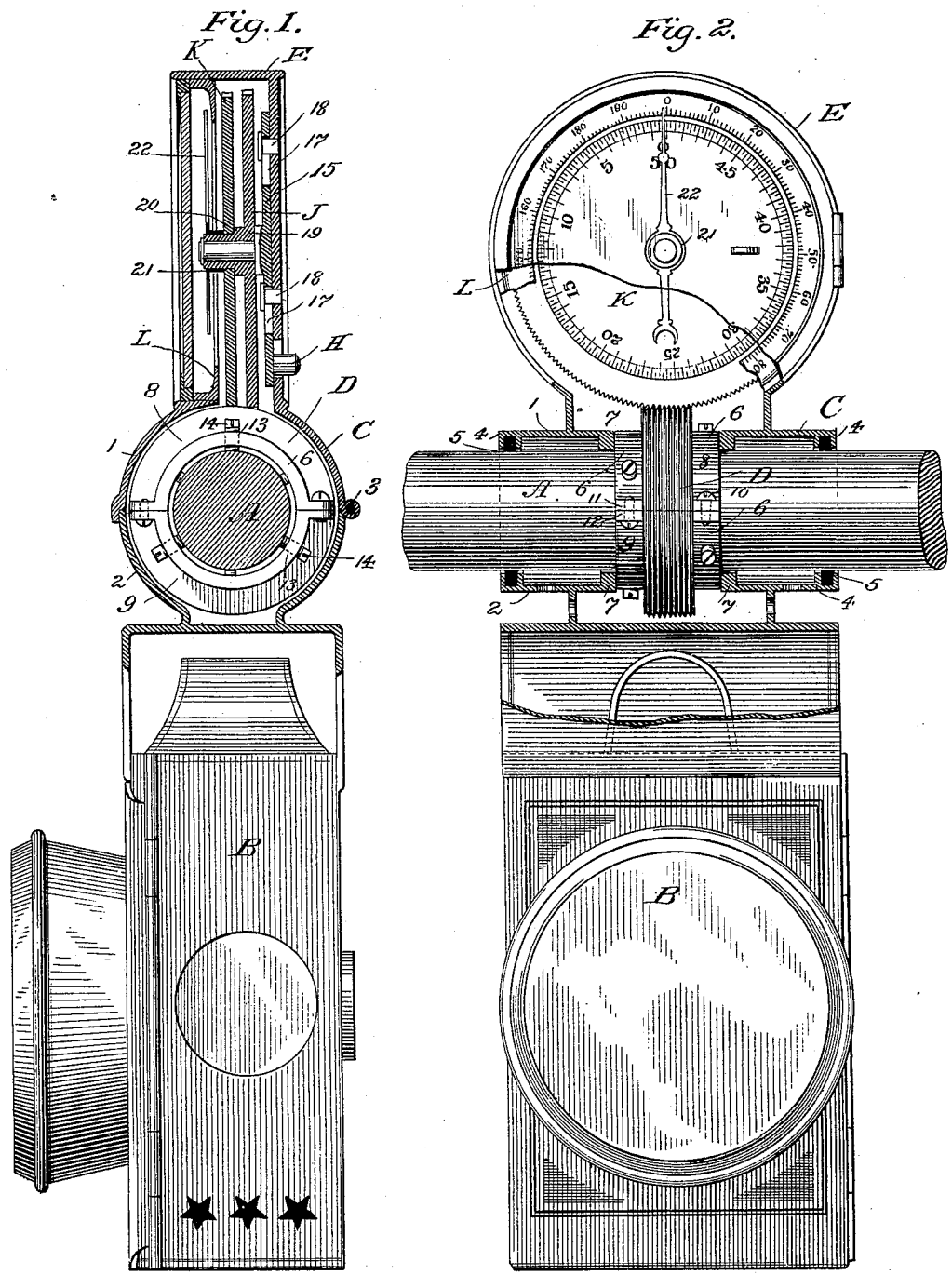

RAYMOND F. BARNES AND MAX HANSMANN, OF WASHINGTON, D. C.

COMBINED LAMP AND CYCLOMETER.

SPECIFICATION forming part of Letters Patent No. 250,483, dated December 6, 1881.

Application filed April 30, 1881. (No model.)

*To all whom it may concern:*

Be it known that we, RAYMOND F. BARNES and MAX HANSMANN, of Washington, in the county of Washington and District of Columbia, have invented a new and useful Improvement in Cyclometers; and we do hereby declare that the following is a full, clear, and exact description of the same.

Our invention relates to an improvement in means for determining and recording the distance traveled by a vehicle, and is especially intended to be used in connection with a hub-lamp on a velocipede or bicycle.

In the use of the bicycle as now constructed it is necessary for safety to the rider and others at night to provide it with a light which shall be visible at some distance, in order to notify drivers and pedestrians of its approach. The common manner of securing such lamp so as to get the full benefit of the light is to allow it to swing from the axle of the spider-wheel. When, however, a cyclometer or distance-register is placed upon the axle, the hub-lamp cannot be used, and this is a source of much inconvenience to bicycle riders who desire to record accurately the distance traveled by night as well as day.

Our invention consists, mainly, in a distance-register or cyclometer supported and held in proper position by a suspended lamp, whereby, first, both devices can be carried upon the axle and used together; second, the lamp acts as a counter-balance and keeps the cyclometer in position, and as a weight to hold it in gear; and, further, in the construction of the cyclometer and its operating mechanism for recording both miles and revolutions.

The invention will be more fully explained in connection with the accompanying drawings, in which—

Figure 1 is a view of the cyclometer in section, and of the lamp in side elevation. Fig. 2 is a front view.

In these figures, A represents the circular axle of a bicycle, from which is suspended the lamp B (which supports the cyclometer, as hereinafter described) by the sectional bearing-cylinder C, consisting of two semi-cylindrical portions, 1 2, hinged at 3, which fit over the axle, and are secured in front by any suitable fastening device. The outer ends of the bearing-cylinder are provided with double flanges 4 4, which hold a leather packing, 5, bearing on the axle, and providing for the noiselessness of the device, as well as for the free revolution of the axle. The lamp thus swings freely.

The construction of the lamp is the same as ordinarily used in making bicycle-lamps, having a suitable oil-reservoir, wick-tube, reflector, and glass front or bull's-eye.

The cylindrical bearing C is cut away centrally for about one-third of its length, to permit of securing upon the axle a collar, D, having flanges 6, which bear against the inner ends, 7, of the part C. The collar D is made in two parts, 8 9, and is secured upon the axle by screws 10, passing through lugs 11 12. In order to provide for the attachment of the collar to axles of different diameter, screw-threaded holes 13 in the flanges 6 receive set-screws 14, which bear upon the axle and hold the collar rigidly in position. The outer face of the sectional collar D is threaded to form a worm, as shown in Fig. 2.

The casing E, which holds the mechanism of the cyclometer, is secured in any suitable manner, as by soldering or riveting, upon the upper part of the lamp-bearing C, and consists of a back plate and an annular rim. Upon the back plate is adjustably secured a sliding plate, 15, having slots 17, into which project pins 18, attached to the back plate. This slide carries the registering mechanism, and is moved to throw such mechanism into and out of gear by a stud, H, passing through a slot in the back plate.

The registering mechanism consists of two differential gear-wheels, J K, carried on a sleeve, 19, working freely upon a pin, 16, attached to the slide 15. These wheels run nearly in contact, being separated by a shoulder, 20, on the sleeve 19. Both wheels J K engage with the worm C, and receive motion in the same direction, the rear wheel, J, turning with the sleeve, of which it may form a part, and to which it is attached, while the wheel K turns upon and independent of such sleeve.

Fixed upon the end of sleeve 19 is a thimble, 21, which carries the index-hand 22, and also serves to hold the wheel K in position on the sleeve.

On the front face of the wheel K is a scale or indicating-gage, which is shown as adapted to register any number of miles up to fifty. A secondary gage, consisting of a metallic ring, L, secured in the case, outside the wheel K and in the path of the hand, registers the number of revolutions, and the whole device is protected by a glass face.

The operation of the registering apparatus is as follows: Supposing the device to be attached to the axle of a bicycle having a driving-wheel fifty inches in diameter, and that the wheel makes four hundred revolutions to the mile and two hundred to the half-mile, the wheel J is provided with two hundred and two cogs or teeth and the wheel K with two hundred. Both these wheels being placed in engagement with worm D by the slide before described, and being driven thereby in the same direction, and the hand being attached to the wheel J, when two hundred revolutions of the driving-wheel have been made, two hundred and two teeth on wheel J have passed a given point, and two hundred on wheel K, and the hand, previously set at 0, will have gradually dropped back a distance equal to the difference, or two cogs, and will have indicated the same on the mile-gage on wheel K. The hand, of course, travels with the wheel to which it is attached steadily around the fixed gage L, which is spaced to indicate revolutions, making one circuit of the fixed gage at each half-mile. One gage therefore verifies the other, and the fixed gage indicates at the end of a run, or whenever the distance is taken, the fraction of a mile over the whole number which the mile-gage shows to have been traveled.

As the weight of the lamp is ordinarily from sixteen to twenty-five ounces, and that of the cyclometer need not exceed half that amount, the vertical position of the latter is maintained at all times, and the weight of the lamp, after the wheels are placed in engagement with the worm, will be sufficient to hold them there, so that the slide might be dispensed with. We prefer, however, to use this slide in connection with the weight of the lamp.

As thus constructed, our cyclometer will indicate accurately the number of miles up to fifty, after which the wheels are thrown out of gear with the worm and reset by means of the hand and a stud, 23.

We do not confine ourselves to this particular manner of attaching a cyclometer to a lamp, for the same might be secured to the back of the lamp-casing and gear with the worm from below; or it could be placed at such an angle that the light from the lamp should shine directly or by reflection upon the face and enable the indicator to be read at night without dismounting. All such modifications wherein the lamp supports the cyclometer and holds it in position are within the scope of our invention.

It will be understood that a special cyclometer is used for each size of driving-wheel, the number of cogs varying with the number of revolutions required by the wheel in traveling a mile. Of course, by increasing the diameter of the gears and decreasing the size of the cogs the registering capacity of the instrument could be increased to a hundred miles, or even more.

The advantages of this construction over the complicated and unreliable forms of cyclometer now in use will be apparent, while its main advantage—in permitting the use of the hub-lamp and cyclometer together—will be fully appreciated by practical bicyclers and others skilled in the art.

Having thus described our invention, we claim—

1. In combination with the revolving axle of a bicycle or other vehicle, a lamp and a distance-register connected together and attached to said axle.

2. A distance-register mounted upon and operated by the axle of a vehicle, in combination with a suspended lamp, by which it is held in a substantially vertical position.

3. The combination of the axle having a worm, D, of gearing adapted to operate a distance-register, and of a suspended lamp for holding the said parts in operative position.

4. The combination of the axle, the sectional worm attached thereto, and the set-screws 14.

5. In combination, the axle A, the sectional collar having worm D, the differential gearing J K, the gage, and the index-hand.

In testimony whereof we have signed our names to this specification in the presence of two subscribing witnesses.

RAYMOND F. BARNES.
MAX HANSMANN.

Witnesses:
L. W. SEELY,
F. L. MIDDLETON.